United States Patent
Alsubaiee et al.

(10) Patent No.: US 10,866,940 B2
(45) Date of Patent: Dec. 15, 2020

(54) METHOD, APPARATUS, AND COMPUTER-READABLE MEDIUM FOR INGESTING SEMI-STRUCTURED DATA IN A COLUMNAR FORMAT

(71) Applicant: X15 Software, Inc., Palo Alto, CA (US)

(72) Inventors: Sattam Alsubaiee, Riyadh (SA); Vinayak Borkar, San Jose, CA (US)

(73) Assignee: FireEye, Inc., Milpitas, CA (US)

( * ) Notice: Subject to any disclaimer, the term of this patent is extended or adjusted under 35 U.S.C. 154(b) by 692 days.

(21) Appl. No.: 15/164,287

(22) Filed: May 25, 2016

(65) Prior Publication Data
US 2017/0193019 A1   Jul. 6, 2017

Related U.S. Application Data

(60) Provisional application No. 62/274,098, filed on Dec. 31, 2015.

(51) Int. Cl.
| | | |
|---|---|---|
| *G06F 16/22* | (2019.01) | |
| *G06F 16/81* | (2019.01) | |
| *G06F 16/84* | (2019.01) | |

(52) U.S. Cl.
CPC ............ *G06F 16/221* (2019.01); *G06F 16/81* (2019.01); *G06F 16/86* (2019.01)

(58) Field of Classification Search
CPC . G06F 17/30008; G06F 16/245; G06F 16/221
See application file for complete search history.

(56) References Cited

U.S. PATENT DOCUMENTS

| | | | | |
|---|---|---|---|---|
| 2011/0307521 A1* | 12/2011 | Slezak | ................ | G06F 16/2453 |
| | | | | 707/800 |
| 2013/0124466 A1* | 5/2013 | Naidu | .................... | G06F 8/453 |
| | | | | 707/610 |

(Continued)

OTHER PUBLICATIONS

Sergey Melnik et al., "Dremel: Interactive Analysis of WebScale Datasets", Proceedings of the VLDB Endowment, vol. 3, No. 1, 2010.

(Continued)

*Primary Examiner* — Mariela Reyes
*Assistant Examiner* — Courtney Harmon
(74) *Attorney, Agent, or Firm* — Amardeep S. Grewal; Reed Smith LLP

(57) ABSTRACT

An apparatus, computer-readable medium, and computer-implemented method for ingesting semi-structured data in a columnar format, including parsing a data record, the data record comprising semi-structured data including one or more data fields and one or more data values corresponding to the one or more data fields, generating a schema corresponding to the data record, the schema comprising the one or more data fields and one or more data types corresponding to the one or more data fields, determining whether the schema corresponding to the data record is homogenous with a schema corresponding to a current row group, wherein the current row group comprises one or more current column names and one or more current column types, and storing the data record as a new record in the current row group based at least in part on a determination that the schema is homogenous.

27 Claims, 10 Drawing Sheets

(56) References Cited

U.S. PATENT DOCUMENTS

2014/0201244 A1* 7/2014 Zhou ..................... G06F 16/00
707/803
2014/0279838 A1* 9/2014 Tsirogiannis ........... G06F 16/22
707/603

OTHER PUBLICATIONS

Julian Le Dem, "Dremel made simple with Parquet", Sep. 11, 2013.

* cited by examiner

| R # | Entries | Col 1<br>A.B.C<br>R D | Col 2<br>A.B.()<br>R D | Col 3<br>A.B.D<br>R D | Col 4<br>A.B.E<br>R D | Col 5<br>A.F.G<br>R D | Col 6<br>A.F.()<br>R D | Col 7<br>A.H()<br>R D | Col 8<br>A.H.I<br>R D | Col 9<br>A.H.K<br>R D | Col 10<br>A.H.L<br>R D |
|---|---|---|---|---|---|---|---|---|---|---|---|
| 1 | A.B.C<br>.C<br>.C | 0 2<br>2 2<br>2 2 | 0 1<br>- -<br>- - | 0 1<br>- -<br>- - | 0 1<br>- -<br>- - | 0 0<br>- -<br>- - | 0 0<br>- -<br>- - | 0 0<br>- -<br>- - | 0 0<br>- -<br>- - | 0 0<br>- -<br>- - | 0 0<br>- -<br>- - |
| 2 | A.B.C | 0 2 | 0 1 | 0 1 | 0 1 | 0 0 | 0 0 | 0 0 | 0 0 | 0 0 | 0 0 |
| 3 | A.B | 0 1 | 0 2 | 0 1 | 0 1 | 0 0 | 0 0 | 0 0 | 0 0 | 0 0 | 0 0 |
| 4 | A.B.D | 0 1 | 0 1 | 0 2 | 0 1 | 0 0 | 0 0 | 0 0 | 0 0 | 0 0 | 0 0 |
| 5 | A.B.E | 0 1 | 0 1 | 0 1 | 0 2 | 0 0 | 0 0 | 0 0 | 0 0 | 0 0 | 0 0 |
| 6 | A.F.G | 0 0 | 0 0 | 0 0 | 0 0 | 0 2 | 0 1 | 0 0 | 0 0 | 0 0 | 0 0 |
| 7 | A.F | 0 0 | 0 0 | 0 0 | 0 0 | 0 1 | 0 2 | 0 0 | 0 0 | 0 0 | 0 0 |
| 8 | A.H | 0 0 | 0 0 | 0 0 | 0 0 | 0 0 | 0 0 | 0 2 | 0 1 | 0 1 | 0 1 |
| 9 | A.H.I | 0 0 | 0 0 | 0 0 | 0 0 | 0 0 | 0 0 | 0 1 | 0 2 | 0 1 | 0 1 |
| 10 | A.B.C<br>.B.C | 0 2<br>1 2 | 0 1<br>1 1 | 0 1<br>1 1 | 0 1<br>1 1 | 0 0<br>- - | 0 0<br>- - | 0 0<br>- - | 0 0<br>0 0 | 0 0<br>0 0 | 0 0<br>0 0 |
| 11 | A.H.K | 0 0 | 0 0 | 0 0 | 0 0 | 0 0 | 0 0 | 0 1 | 0 1 | 0 2 | 0 1 |
| 12 | A.H.K<br>.H<br>.H.K<br>.K | 0 0<br>- -<br>- -<br>- - | 0 0<br>- -<br>- -<br>- - | 0 0<br>- -<br>- -<br>- - | 0 0<br>- -<br>- -<br>- - | 0 0<br>- -<br>- -<br>- - | 0 0<br>- -<br>- -<br>- - | 0 1<br>1 1<br>1 1<br>- - | 0 1<br>1 1<br>1 1<br>- - | 0 2<br>1 1<br>1 2<br>2 2 | 0 1<br>1 1<br>1 1<br>- - |
| 13 | A.H.L<br>.H.L<br>.H<br>.H.L<br>.L | 0 0<br>- -<br>- -<br>- -<br>- - | 0 0<br>- -<br>- -<br>- -<br>- - | 0 0<br>- -<br>- -<br>- -<br>- - | 0 0<br>- -<br>- -<br>- -<br>- - | 0 0<br>- -<br>- -<br>- -<br>- - | 0 0<br>- -<br>- -<br>- -<br>- - | 0 1<br>1 1<br>1 1<br>1 1<br>- - | 0 1<br>1 1<br>1 1<br>1 1<br>- - | 0 1<br>1 1<br>1 1<br>1 1<br>- - | 0 2<br>1 2<br>1 1<br>1 2<br>2 2 |

METHOD, APPARATUS, AND COMPUTER-READABLE MEDIUM FOR INGESTING SEMI-STRUCTURED DATA IN A COLUMNAR FORMAT

RELATED APPLICATION DATA

This application claims priority to U.S. Provisional Application 62/274,098 filed Dec. 31, 2015, the disclosure of which is hereby incorporated by reference in its entirety.

BACKGROUND

Columnar storage is a technique used by many database systems to store the columns of a table separately. In many cases, the users are only interested in querying a subset of the table columns. Therefore, it would make more sense to store the values of each column separately from other columns. Subsequently, at query time, the engine will only access the columns that appear in the query and ignore other columns. By doing that, the IO cost can be dramatically reduced and, as a result, the query time is reduced as well. Another advantage of columnar storage is that, besides compressing the pages of the table using compression techniques (such as Snappy, LZ4, GZIP, etc.), the system can take advantage of the many popular encoding schemes (such as run length encoding, delta encoding, etc.) that exploit the similarity of adjacent data to encode the data. This allows for further reduction of the size of the stored data, which can reduce the IO cost even further.

Columnar storage is described in greater detail at https://en.wikipedia.org/wiki/Column-oriented_DBMS. One popular columnar format that has got a lot of attention recently is Apache Parquet. Parquet is based on the techniques described in a paper titled "Dremel: Interactive Analysis of Web Scale Datasets" to Melnik et al. ("Dremel Paper") (accessible at http://static.googleusercontent.com/media/research.google.com/en//pubs/archive/36632.pdf), the disclosure of which is hereby incorporated by reference in its entirety. Parquet uses techniques described in the Dremel Paper to support columnar storage representation for nested records. An overview of Parquet can be found at https://blog.twitter.com/2013/dremel-made-simple-with-parquet ("Parquet Overview"), the disclosure of which is hereby incorporated by reference in its entirety.

A Parquet file consists of multiple row groups. A row group is a logical horizontal partitioning of the data into rows and includes a column chunk for each column in the dataset. All the records in a Parquet file share the same schema, which is saved in the metadata of the file. Parquet has been built to work on Hadoop File System (HDFS). HDFS is an append-only file system. Therefore, Parquet accumulates the values of the different columns in memory pages, compresses them, and then flushes them to disk. At query time, Parquet loads a full row group to memory, reads the pages of the row group one by one, un-compresses the pages, and processes their content. When it is done with the current row group, Parquet loads the next row group to memory and repeats the same process. As explained in the Parquet Overview, Dremel and Parquet use the concept of definition levels and repetition levels to be able reconstruct the nested records at query time.

As further explained in the Parquet Overview, in order for Dremel/Parquet to encode nested data structures in columnar format, the schema of the records is first mapped to a list of columns so that the records can be written to flat columns. In Parquet, one column is created for each primitive type field that appears in the schema. In other words, if we represent the schema as a tree, the primitive types are the leaves of this tree.

Parquet is then able to read the data values back to their original nested data structure by storing three pieces about each column value, namely, the content of the value itself, the definition level, and the repetition level. The two level values are used to construct the nested data structures. Definition levels specify how many optional fields in the path for the column are defined. The definition level will vary from 0 at the root of the schema up to the maximum level for a particular column.

Repetition levels specify the level at which it is necessary to create a new list for the current value. In other words, the repetition level can be seen as a marker of when to start a new list and at which level.

The Parquet Overview provides a more detailed description of definition and repetition levels. If the data that we are dealing with is flat (i.e., there is no nesting at all) and there are no optional fields, then the definition and repetition values for all the column values will be zeroes.

As explained in the Dremel paper, in Dremel (and Parquet which is based on Dremel), "NULLs are not stored explicitly as they are determined by the definition levels: any definition level smaller than the number of repeated and optional fields in a field's path denotes a NULL." In other words, Nullity is encoded in the definition levels (which is run-length encoded). NULL values are not encoded in the data. For example, in a non-nested schema, a column with 500 NULLs would be encoded with run-length encoding (0, 500 times) for the definition levels and nothing else.

All of the above-described techniques for columnar storage are directed to storage of structured data, and require a priori knowledge of the schema in order to efficiently store and query the data. Accordingly, improvements are needed in systems involving columnar storage and retrieval of semi-structured data for which the data schema is not known.

BRIEF DESCRIPTION OF THE DRAWINGS

FIGS. 6A-6D illustrates an example set of records that are to be ingested in order and an example repetition and definition level table after ingestion of all of the records according to an exemplary embodiment.

DETAILED DESCRIPTION

While methods, apparatuses, and computer-readable media are described herein by way of examples and embodiments, those skilled in the art recognize that methods, apparatuses, and computer-readable media for ingesting semi-structured data in a columnar format and encoding repetition and definition level values are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include," "including," and "includes" mean including, but not limited to.

Applicant has discovered methods, apparatuses, and computer-readable media for ingesting semi-structured data in a columnar format. Once the semi-structured data is ingested and stored in columnar format, the data is then able to be queried using query commands which utilize the column information. Additionally, Applicant has discovered methods, apparatuses, and computer-readable media for encoding repetition and definition level values for a semi-structured data record while storing the semi-structured data in columnar format. The present system is able to store semi-structured data having different schemas and then is able to query the data efficiently. The present system does not require knowledge of the schema of the data a priori and is able to efficiently ingest records of different schemas.

Methods, apparatuses, and computer-readable media are disclosed herein. In the present system, each data file is broken up into row groups. Each row group is a collection of records (rows). Within each row group, the records themselves are physically broken to column chunks (i.e., each column chunk will maintain the values of a specific column within the row group). Each column chunk is broken to pages.

Figure 1:
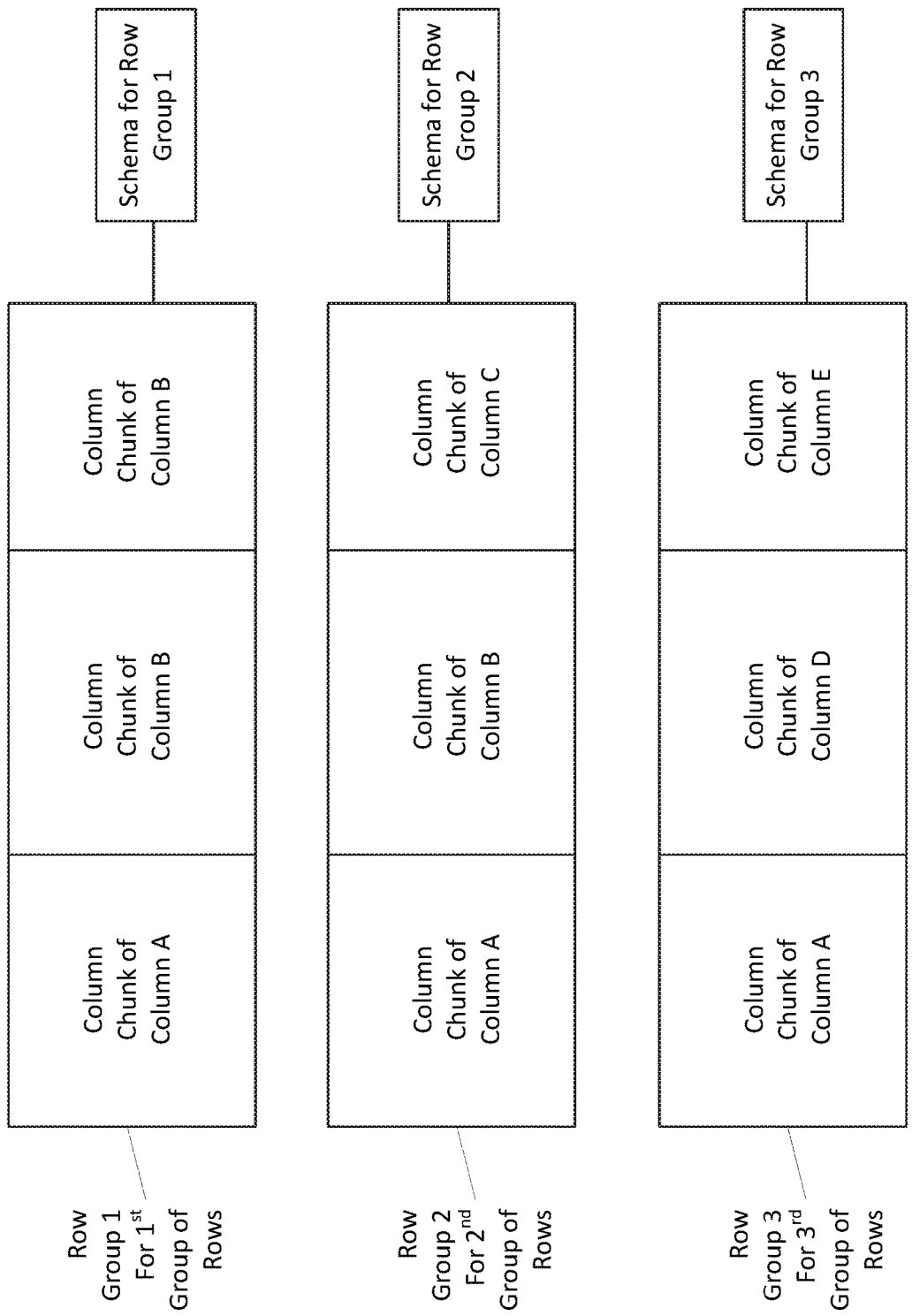
FIG. 1 illustrates an example of the data storage of the present system according to an exemplary embodiment.

FIG. 1 illustrates an example of the data storage of the present system. As shown in FIG. 1, unlike other columnar storage systems, each of row groups has an associated schema for that specific row group. As a result, each of the row groups can store column chunks for different columns. For example, row group 3 in FIG. 1 contains column chunks corresponding to columns A, D, and E, whereas row groups 1 and 2 contain column chunks corresponding to columns A, B, and C.

Figure 2:
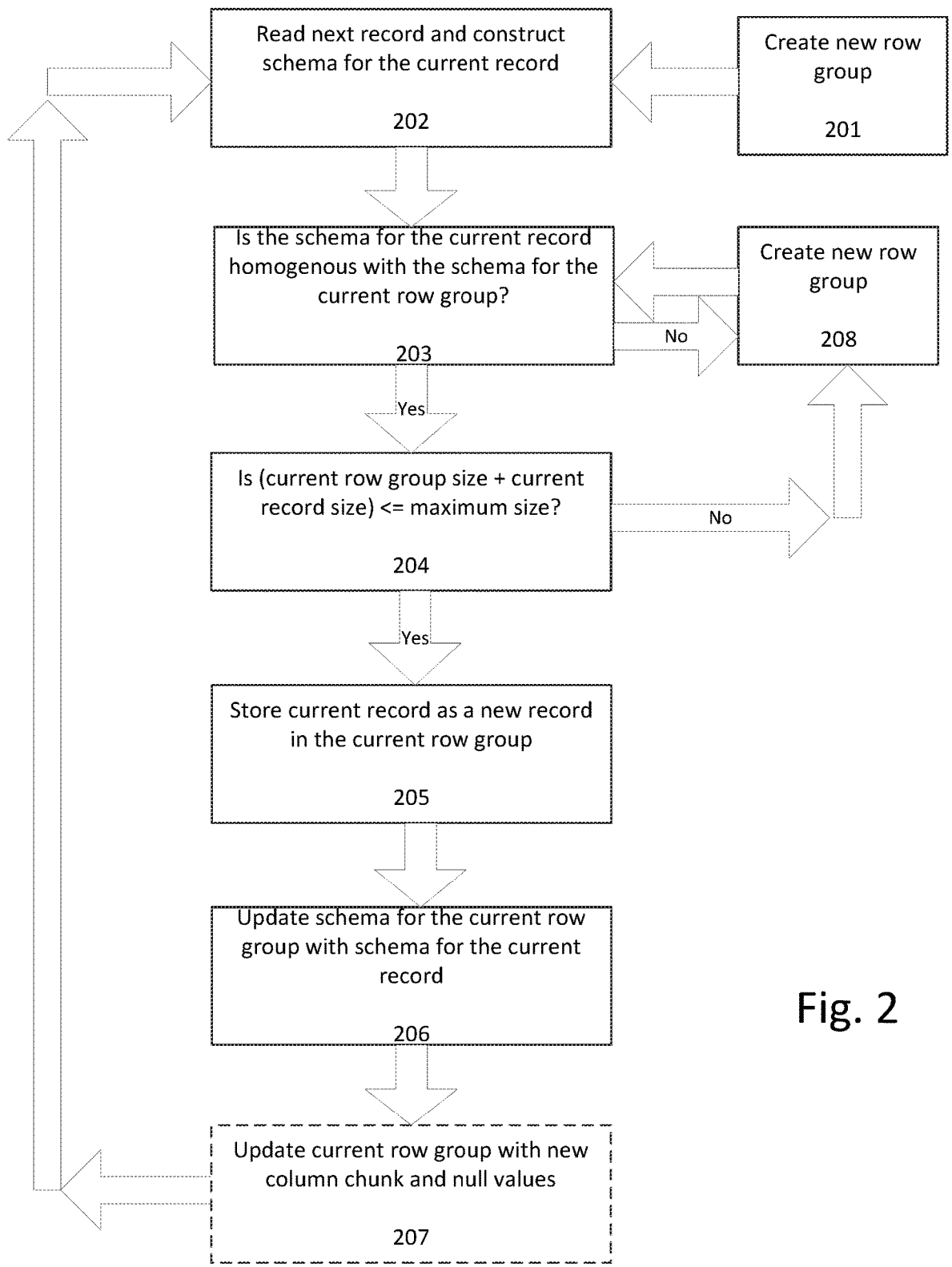
FIG. 2 illustrates a flowchart for storing semi-structured data in a columnar format according to an exemplary embodiment.

FIG. 2 illustrates a flowchart for storing semi-structured data in a columnar format according to an exemplary embodiment. When a new columnar file is created, prior to ingestion (loading) of the semi-structured records into the file, the system has no knowledge of the schema of the dataset that is about to be loaded. At step 201 a new row group is created which is empty. This step can be performed at the beginning of ingestion of the data records.

At step 202 the next record in the data set is read, set to the current record, and parsed. Initially, the next record will be the first record in the data set. The data record can include semi-structured data including one or more data fields and one or more data values corresponding to the one or more data fields.

Additionally, a schema corresponding to the data record is constructed for the record at step 202. The schema can include the one or more data fields and one or more data types corresponding to the one or more data fields. The schema can define the fields in the record as well as the data type of each field in the record. For example, the first record can be:

Customer("Bob Jones"), Store_ID(231)

In this case, using the format Field_Name(Field_Type), the constructed schema for the record would be Customer (String), Store_ID(Int).

At step 203 a determination is made regarding whether the schema for the current record is homogenous (compatible) or heterogeneous (incompatible) with the schema for the current row group. The current row group can include one or more current column names and one or more current column types. Additionally, the schema corresponding to the current row group can include one or more current fields corresponding to the one or more current column names and one or more current data types corresponding to the one or more current column types.

In the event that the row group is empty, then the schema for the current record will be homogeneous with the schema for the current row group since the schema for the current row group is an empty set.

Two schemas S1 and S2 are determined to be heterogeneous when there are fields F1 in S1 and F2 in S2, such that F1's name equals F2's name and F1's type does not equal F2's type. If there are no such fields in S1 and S2, then schemas S1 and S2 homogenous.

A few schema examples are shown below to illustrate the different possibilities (the used format in the examples is field_name(field_type)):

[2] a(Int) b(Int) c(String)
[3] a(Int) b(Int) c(String)
[4] a(String) b(Int) c(String)
[5] a(Int) b(Int)
[6] a(Int) c(double)
[7] a(Int) b(Int) c(String) d(Int)
[8] x(Int) y(double) z(double)

In the above schema examples, we can say that schemas 1 and 2 are homogenous. Similarly, schemas 1 and 4 are homogenous. However, schemas 1 and 3 are heterogeneous because the field a in schema 1 is of type Int, while field a in schema 3 is of type String. Schemas 1 and 7 are also homogenous. Schemas 5 and 6 are heterogeneous because field c in schema 5 is of type Double, while field c in schema 6 is of type String. Step 203 can include comparing all of the field names of the schema for the current record to all of the field names of the schema for the row groups. If any matching field names are found, then step 203 can further include comparing the field types of the schema for the current record with the field types of the schema for the current row group for all of the matching field names. If the system detects any matching field names which do not also have a corresponding matching field type, then the two schemas can be determined to be heterogeneous. Otherwise, the two schemas can be determined to be homogeneous.

If the schema of the current record is not homogeneous with the schema for the current row group, then at step 208 a new row group is generated and set to the current row group. The new row group can include one or more new column names corresponding to the one or more fields in the current record and one or more new column types corresponding to the one or more data types in the current record. Additionally, a schema corresponding to the new row group is generated based on the schema corresponding to the data record and the data record is stored as a new record in the new row group. The schema corresponding to the new row group can also be stored. The process then returns to step 203.

If the schema of the current record is homogeneous with the schema for the current row group, then at step 204 a determination is made regarding whether there is sufficient room in the current row group to store the current record. This can include determining whether the current row group size+the size of the current record is less than or equal to a maximum size for the row group. The maximum size for each row group can be predetermined and set by a user or automatically determined based on the limitations of the computing environment.

If the current row group size+the size of the current record exceeds the maximum size for the row group, then the process proceeds to step 208, where a new row group is created and set to the current row group, and then on to step 203, as discussed above.

If the schema corresponding to the current record is homogenous with the schema corresponding to a current row group and the current row group size+the size of the current record is less than or equal to the maximum size for the row group, then the process proceeds to step 205, and the current record is stored as a new record in the current row group.

If the schema for the current row group includes fields which are not in the current record, then this step can include setting the values of the fields which are in the schema for the current row group but which are not in the current record to NULL values. This can include identifying at least one missing field in one or more fields of the current row group which does not appear in the data fields of the schema for the current record and storing a NULL value in at least one column chunk in the current row group corresponding to the missing field for the current record.

At step 206 the schema for the current row group is updated with the schema for the current record. For example, if the schema for the current row group was:
 a (Int), b (Int), c (String)
And the schema for the current record was:
 a (Int), d (double)
Then the schema for the current row group would incorporate the new fields in the schema for the current record, resulting in an updated schema for the current row group:
 a (Int), b (Int), c (String), d (double)

Step 206 can include comparing all fields in the schema for the current row group with all fields in the schema for the current record to identify at least one new field in the schema in for the current record which does not appear in the current fields of the schema for the current row group. Step 206 can also include adding any identified fields (and their corresponding data types) which appear in the schema for the current record but not in the schema for the current row group to the schema for the current row group. In other words, the step of updating the schema for the current row group can include taking the union of the schema for the current row group and the schema for the current record.

It is possible that the new record has a new field which was not previously part of the schema for the row group. In the example shown above, the d field is a new field which was not previously part of the schema for the current row group. In this case, at step 207, the current row group can be updated with a new column chunk corresponding to the new field and the values of each of the records previously stored in the current row group can be set to NULL values for the new column chunk (excluding the new record that was added in step 205, since that record could have contained a non-NULL value for the new field). For example, step 207 can include adding at least one column chunk corresponding to at least one new field to the column chunks in the current row group, storing data values from the current record in corresponding column chunks, and storing a NULL value in the new column chunks for any existing records in the current row group.

After step 207 (or step 206 if there are no new fields in the schema of current record relative to the schema of the current row group), the process returns to step 202 and continues until there are no more records to read in the file or the process is halted by a user or due to system limitations (such as disk space).

Using the present system, multiple row groups are created for the input data, and rather than having a single schema for all of the input data, each row group has its own schema which can be different from the schemas of other row groups. The schemas for all of the row groups for the input data can be kept in a metadata section at the end of the file along with other bookkeeping information and can be linked to their respective row groups, such as by an index value, pointer, or other means. Once the semi-structured data is stored in a columnar format, the system can then utilize various encoding techniques and compression schemes to more efficiently store the data.

Of course, the techniques described herein for ingesting semi-structured data can also be utilized to ingest structured data. In this case, the schema for the data set will be uniform (since the data is structured according to some pre-existing schema) and a new row group will only be created when a current row group size exceeds a maximum size.

Additionally, as will be discussed in greater detail with reference to FIGS. 4-6, the input data records can include one or more entries and the process shown in FIG. 2 can also include encoding repetition and definition levels of the one or more entries for each column chunk in the one or more column chunks in the current row group.

Figure 3:
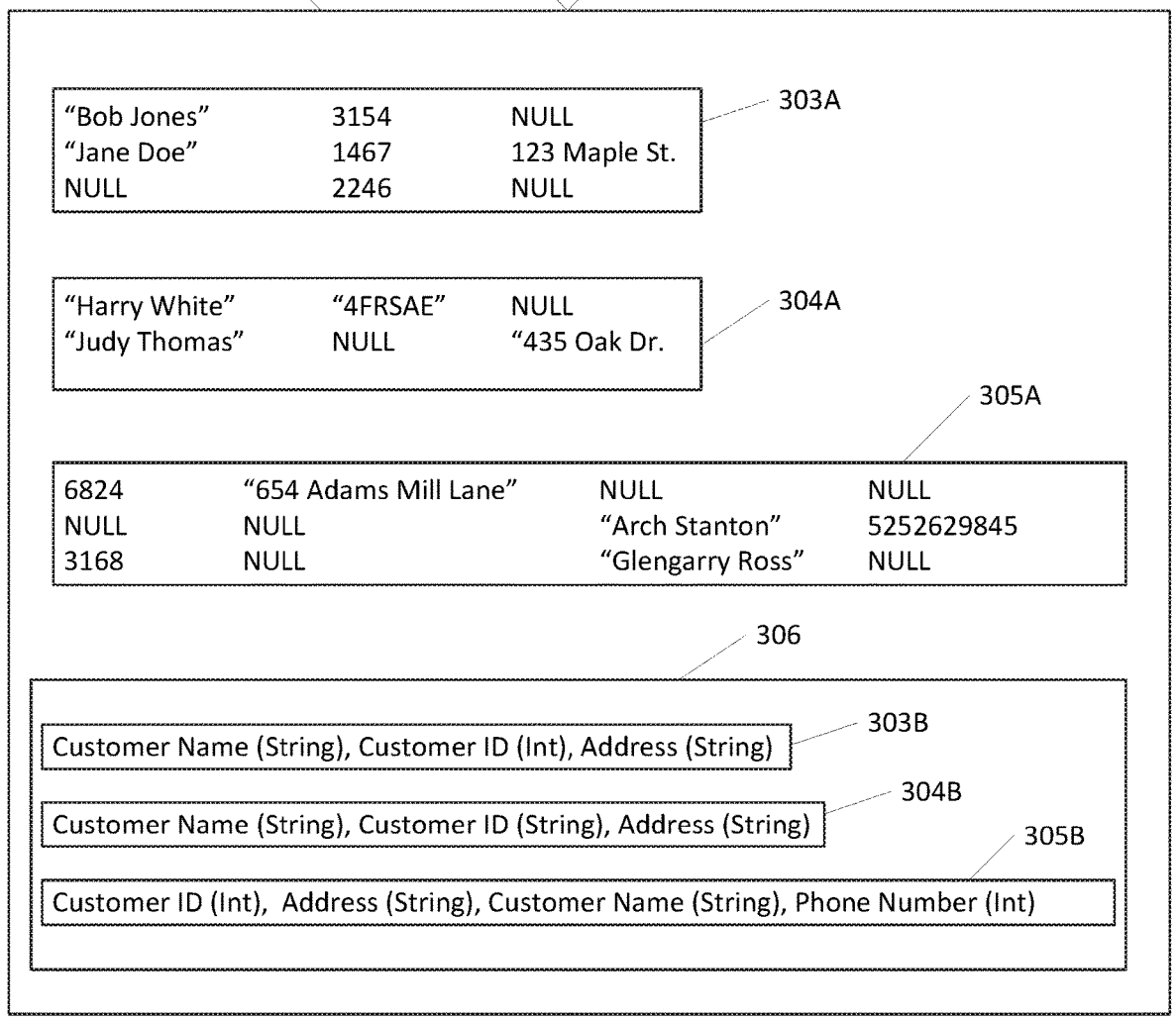
FIG. 3 illustrates an example of the data ingestion process according to an exemplary embodiment.

FIG. 3 illustrates an example of the data ingestion process according to an exemplary embodiment. Input data 301 is ingested using the methods described above to generate columnar data 302. As shown in FIG. 3, columnar data 302 includes a first row group 303A having column chunks for Customer Name, Customer ID, and Address columns, a second row group 304A having column chunks for Customer Name, Customer ID, and Address columns, and a third row group having column chunks for Customer Id, Address, Customer Name, and Phone Number columns.

The columnar data 302 also includes a metadata section 306 including data schema 303B corresponding to row group 303A, data schema 304B corresponding to row group 304A, and data schema 305B corresponding to row group 305A.

As shown in FIG. 3, when record 4 is ingested, the system will detect that the schema of record 4 has a field "Customer ID" which is of the type "string" and therefore is heterogeneous with the schema 303B for the first row group 303A which has a field "Customer ID" which is of the type "int." This results in the creation of the second row group 304A and corresponding second schema 304B.

Similarly, when record 6 is ingested, the system will detect that the schema of record 6 has a field "Customer ID" which is of the type "int" and therefore is heterogeneous with the schema 304B for the second row group 304A which has a field "Customer ID" which is of the type "string." This results in the creation of the third row group 305A and corresponding third schema 305B.

Additionally shown in FIG. 3, when a new record is added that has a schema with a new field relative to the schema of the current row group, that new field is added to the schema of the current row group and all records in that row group are updated to have a NULL value for that row group. For example, when record 2 is added to the first row group 303A, the new field of "Address" is added to the corresponding schema 303B and the value of the "Address" field of record 1 is set to Null.

As discussed earlier, once the data has been ingested, it can then be queried. For example, a query identifying one or more data fields and one or more corresponding data types can be received. This can be used to identify a schema in one or more schemas (such as those stored in metadata section 306 of FIG. 3) which is homogenous with the one or more data fields and the one or more corresponding data types in the query. The row group corresponding to the identified schema can then be used as the target of the query. The query can then be executed on the corresponding row group to return data responsive to the query. For example, the data fields can be matched to the column chunk names and some selection condition can be applied to return a set of data which is responsive to the query.

It is possible to have an extreme scenario where there will be a large number of row groups created with only a small number of records in them, due to ingesting multiple heterogeneous records. For example, assume that there are two data sources (source1 and source2) that feed records into a columnar format. Assume all records that are produced by source1 are of the following schema:

a (Int), d (Int)

Additionally, assume that all records that are produced by source2 are of the following schema:

a (String), d (Int)

Clearly, the schema of the records produced by source1 and source2 are heterogeneous because the field a in a record produced by source1 is always of type Int, while field a in a record produced by source2 is always of type String. Assume that source1 produces records at time t1, t3, t5, t7, etc. While source2 produces records at time t2, t4, t6, t8, etc. Also assume that every produced record is ingested into the columnar format at the same time it was produced (e.g., record 1 is produced at time t1 and also ingested into the columnar format at time t1).

In this case, the schema of every ingested record is heterogeneous with the schema of the subsequent ingested record. As a result, every ingested record will create a new row group.

Having a large number of row groups with a small number of records is not preferable since it could degrade the system's performance in many ways. To get the performance benefits of a columnar storage format, it is preferable to have a large number of records in every row group. For instance, the default size of a row group in Parquet is 1 GB.

Accordingly, Applicant has invented a method for parsing heterogeneous records to avoid creating a large number of row groups with a small number of records in them. The method involves buffering the created row groups in memory while ingesting new records. The buffering of row groups allows the system to review incoming records and determine which row group (if any) is compatible with each record. For every ingested record, the system will check if there exists a compatible row group that can store the new record. As discussed above, a row group is said to be compatible with a record when the schemas of the row group and the record are homogenous. If there exists a compatible row group, then the new record will be stored in this row group. Otherwise, a new row group will be created, and the new record will be stored in the new row group. A buffered row group can be flushed to disk and appended to the columnar storage file when its size reaches a specified threshold.

Referring to the example above, when ingesting the first record from source1 at time t1, a new row group, called rg1, will be created and buffered in memory. When ingesting the first record from source2 at time t2, another new group, called rg2, will be created and buffered in memory. Next, when ingesting the second record from source1 at time t3, this record will not create another row group since there exist a compatible row group, which is rg1. Therefore, in this specific example, there will only be two row groups at any given point in time, which are rg1 and rg2. Those row groups will be flushed to disk periodically when their sizes reach the specified threshold.

In the event that the input data records contained nested information, the nested data can be stored by storing all the nested fields with their parent (root) field as a binary large object (BLOB). For example, if the following record was part of the input data:

```
{
    "Address" : {
        "street name": "Alton Blvd.",
        "number":123
    },
    "Phone number": 123456789
}
```

The resulting columnar data will have two columns. The first is named "Address," which is of type "Record," and its values are byte arrays that contain the nested fields (street name and number). The second column is named "Phone number," and its values are of type Integer.

As explained earlier, when ingesting a new record into the columnar store, if the new record has been determined to be homogenous with the row group's schema, then a new column must be added for every new field that was not previously in the row group. Consequently, NULL values must be added for all existing records in the current row groups to indicate that this new field is NULL for previous records.

As discussed in the Dremel Paper and the Parquet Overview, Dremel and Parquet use repetition levels and definition levels to reconstruct nested records. However, in Dremel and Parquet, when a field in a record is NULL, that does not mean its repetition level and definition level will necessarily be zeroes. In these systems, since the schema of the dataset that is being ingested is known in advance, the repetition levels and definition levels of those fields which have NULL values can be decoded easily.

However, if the schema is unknown in advance (such as when ingesting semi-structured data), then whenever there is a new field in a record, it is necessary to go back to all the ingested records for a particular row group and encode repetition levels and definition levels for them.

Applicants have also discovered a system and method for encoding repetition levels and definition levels when ingesting (reading) semi-structured data and storing the data in columnar format. This method can be utilized in conjunction with the method described with regard to FIG. 2 and allows for efficient encoding of repetition levels and definition levels.

Figure 4:
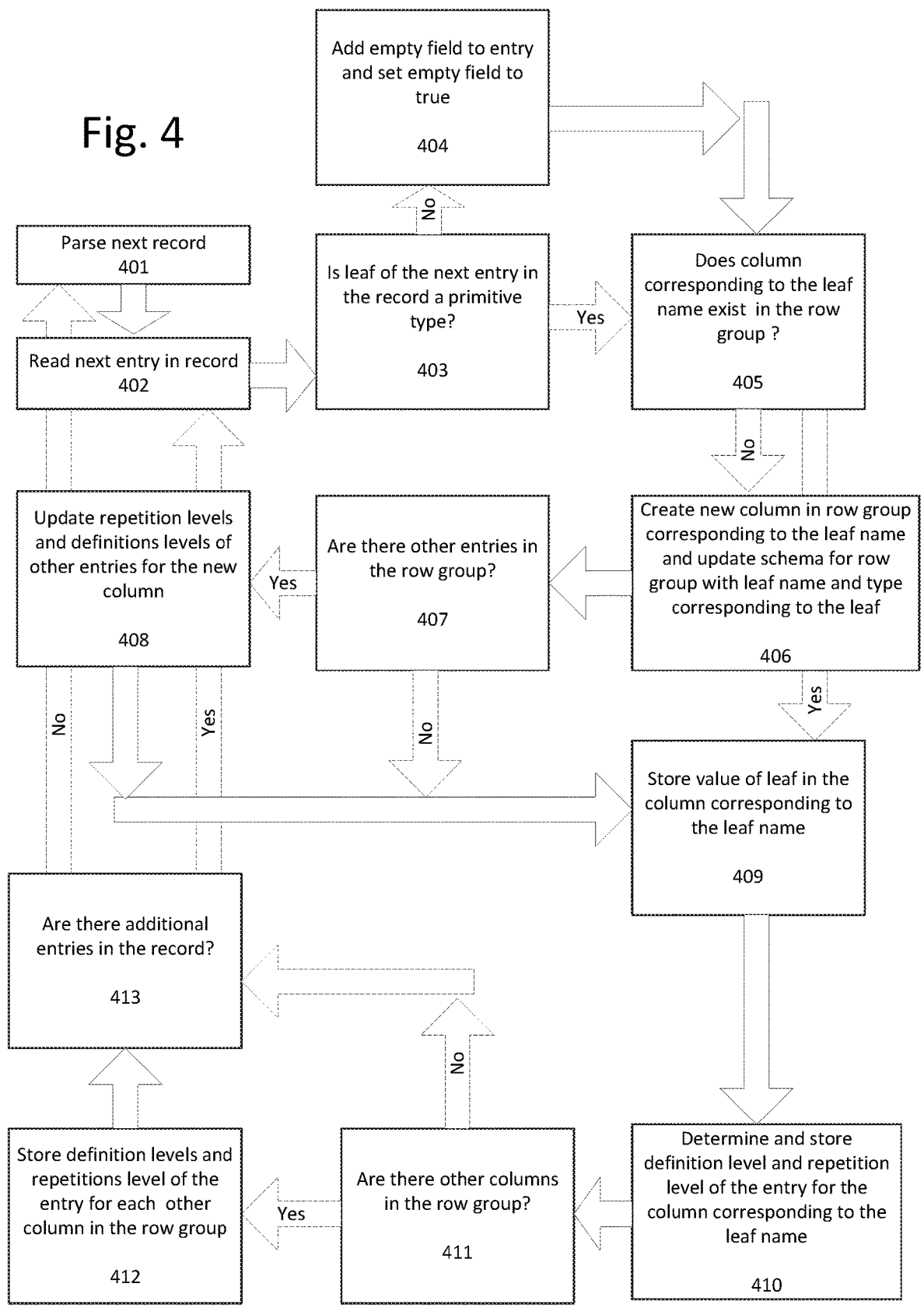
FIG. 4 illustrates a method for encoding repetition and definition level values for a semi-structured data record while storing the semi-structured data in columnar format according to an exemplary embodiment.

FIG. 4 illustrates a method for encoding repetition and definition level values for a semi-structured data record while storing the semi-structured data in columnar format according to an exemplary embodiment. The steps shown in FIG. 4 can correspond to steps 205-207 of FIG. 2. At step 401 the next record is parsed. Initially, the next record will be the first record. The record can be parsed to detect levels of nesting and types of input fields in the record. For example, the record being parsed can be:

```
           {
          A {
           B{
            C
            C
            C
           }
          }
           }
```

In the above example, A, B, and C each correspond to different fields. For example, C can be a "phone number" field as discussed earlier. The parsing step of 401 can detect the levels of nesting of each of the fields (in this case, based on the level of brackets or indentation), as well as the data type of each of field. For purposes of explanation, a simplified notation is adopted herein, so that the above record can be represented in the simplified notation as the following entry:
A.B.C
.C
.C At step 402 the next entry, including the next leaf, in the record is read. When the record is initially parsed, the next entry will be the first entry. The entry specifies one or more data fields in the data record and the leaf corresponds to a last data field in the entry which is a primitive data type. As will be discussed below, if the last data field in an entry is not a primitive data type, one can be added to the entry. In a nested entry, the leaf can be the data field at the lowest level of nesting. In the above example, the first entry can be referred to by the field names in the entry, "A.B.C," the leaf would be identified as "C" and the name of the leaf can be given by the nesting path of the leaf within the data record, so that in this case, "A.B.C" would be the leaf name of the leaf in the first entry. Similarly, the second entry can be referred to by the field names in the second entry "C" and name of the second leaf "C" would also be "A.B.C" since the nesting path of the second leaf in the data record is also A.B.C. It should be noted that, as used herein, the terms "leaf name" and "nesting path of the leaf" are used interchangeably, as the nesting path of the leaf is used as the leaf name.

After the next entry is read, a leaf of the entry can be identified. This identification step can include step 403, in which it is determined whether the last field of the entry is a primitive data type. A primitive data type is a basic data type such as Char, Integer, Double, String, Float, etc., and is not defined by other data types. For example, a data record type which contains Integers or other data types is not a primitive data type, but an Integer type is a primitive data type. As discussed earlier, the parsing step detects the data types for all fields and these data types are then used to determine which leafs are a primitive data type. For purposes of the simplified notation used herein, a primitive data type can be represented using an underline. So if the field "C" was a primitive data type, then the simplified notation of the above record would be:
A.B.C̲
.C̲
.C̲

Returning to step 403, if the last field in the entry is not a primitive data type, then at step 404 a new data field is added to the entry after the last data field and set to true. This new data field can be used to denote an empty data field and can be a Boolean field or an Integer that takes only two values (0 and 1). By performing this step, a primitive data field is effectively added to the entry. The new data field added to the entry can then be set as the leaf of the entry. For example, if the last field in the entry was "B," since B is not a primitive data type (it is not underlined), then at step 404 a new data field would be added to the entry and the value of the new data field would be set to true. Of course, the name of the new data field is selected so that it does not conflict with any fields in the row group. For example, the new data field could be set to -IsLeafEmpty. As step 404 adds a new data field to the entry and sets this new data field as the leaf, the leaf name will reflect the empty field. For example, if an entry comprising data fields A.B had a new data field added and set as the leaf, then the leaf name could be A.B.IsLeafEmpty, which would reflect the nesting path of the leaf.

Returning to step 403, if the last field of the entry is a primitive data type, then the last field of the entry is set as the leaf of the entry. For example, if the entry was A.B.C̲, then the leaf would be C̲ and would have a leaf nesting path/name of A.B.C̲.

At step 405 it is determined whether a column corresponding to the leaf name (a column corresponding to the nesting path of the leaf) exists in the row group. In our earlier example, the leaf name/nesting path was A.B.C̲, so at step 405 it is determined whether a column corresponding to A.B.C̲ exists in the row group. This can be determined by checking the column names of the row group as all of the columns in the row group are named based on the nesting paths of earlier leaves in earlier entries and/or earlier records. The column names can be compared to the leaf name to determine if a match exists. If there is a match, then a column corresponding to the leaf name exists in the row group.

If no column corresponding to the leaf name exists in the row group, then at step 406 a column is created in the row group corresponding to the leaf name and the schema for the row group is updated with the leaf name and data type. The column can take the leaf name as a column name. Column as used herein is intended to include "column chunks" as discussed earlier. This will indicate to the system that definition and repetition levels of existing records for the new column will need to be set, as discussed later in this description.

After column creation, at step 407 it is determined whether there are other entries in the row group. If so, the other entries will need to be updated with repetition levels and definition levels for the new column and the process proceeds to step 408. The process for updating the repetition levels and definition levels of other entries for the new column is described in detail with reference to FIG. 5.

At step 409 the value of the leaf is stored in the column corresponding to the leaf name (the nesting path of the leaf within the data record). As discussed earlier, this can be an existing column in the row group or one that was created in step 406. Note that in the case of a new field added to the entry, this value will be a Boolean true value. The values of fields are not shown in the simplified notation for clarity, but if the field C was an Integer type, then the value could be something like: 2141235472.

At step 410 the definition level and the repetition levels of the entry for the column corresponding to the leaf name are determined and stored in a table of repetition and definition levels for the current row group. The repetition level of the entry for the column corresponding to the leaf name is based at least in part on a determination of whether a previous entry occurs prior to the entry in the data record and whether the previous entry includes a previous leaf which shares at least a portion of the nesting path of the leaf. For example, if the entry is a first entry in the data record, then the repetition level of the entry for the column will always be zero. However, if the entry is a second entry in the data record, then the repetition level will depend on the previous entry. In this case, the repetition level will be based on the level of nesting of the longest common prefix of data fields between the leaf name of the previous entry and the leaf name of the current entry. For example, if the two entries in the data record were:

Entry 1: A.B.C
Entry 2: .C

Then the leaf name of the first entry would be A.B.C and the leaf name of the second entry would also be A.B.C. In this case, the longest common prefix is A.B.C. The level of nesting of this longest common prefix is two, since A has a nesting level of zero, B has a nesting level of one, and C has a nesting level of two. Therefore, the repetition level of the second entry would be two. The repetition level of the first entry will be zero, as discussed above.

For another example, assume that the two entries in the record are:

Entry 1: A.B.C
Entry 2: A.B.IsLeafEmpty

In this case, the longest common prefix of the two entries is A.B, which has a nesting level of one. In this case, the repetition level of the second entry will be one. The repetition level of the first entry will be zero, as discussed above.

The definition level of the entry for the column corresponding to the leaf name is based at least in part on a nesting level of the leaf of the entry in the data record. For example, if the entry is A.B.C, then the leaf is C and is at nesting level two (there are two fields prior to this field). Therefore, the definition level of the entry for the column corresponding to the leaf name would be two. Additionally, if the entry is A.B, then we know that new field will be added to the entry to result in A.B.IsLeafEmpty, which also would have a definition level of two.

At step 411 it is determined whether there are other columns in the row group. If so, the repetition levels and the definition levels of the entry for the other columns are determined and stored at step 412, as is discussed below.

The definition level of an entry for another column can be determined by identifying the longest common prefix between one or more data fields in the other column and one or more data fields in the nesting path of the leaf of the entry, determining a last data field of the longest common prefix, and setting a definition level of the entry for the other column to be a level of nesting of the last data field within the longest common prefix.

In our previous example, if another column named A.B.D existed in the row group, then the definition level of the entry A.B.C for that column can be determined by identifying the common prefix (in this case A.B), determining the last data field in the common prefix (B), and setting the definition level of entry A.B.C for column A.B.D to be the level of nesting of the last data field within the longest common prefix (the level of nesting of "B" within "A.B"), which is one. The definition level in this case would be one.

Additionally, the repetition level of the entry for another column can be determined by first determining whether the entry is a first entry in the data record. If the entry is a first entry of a record, then the repetition level will be zero.

If the entry is not a first entry of a record, then the longest common prefix is determined between one or more data fields in the other column and one or more data fields in the nesting path of the leaf of the entry (the leaf name). The repetition level of the entry can then be set to the level of nesting (the depth) of the first data field common to both the entry and the longest common prefix within the longest common prefix. If no fields in the entry occur within the longest common prefix, then the repetition level and the definition level of the entry will both be empty (they will not be set).

For example, if a record contained the following entries:
Entry 1: A.B.C
Entry 2: B.C
Entry 3: B.C The repetition level of the first entry for a column A.B.D would be zero since it is the first entry. To determine the repetition level of the second entry, the longest common prefix between the leaf name (which is the nesting path A.B.C) and the column name (A.B.D) is identified. This longest common prefix is A.B. The repetition level of the entry is then given by the level of nesting of the first field common to both the entry (B.C) and the longest common prefix (A.B) within the longest common prefix (A.B). The first field common to both the entry and the longest common prefix is B. This level of nesting (depth) of this field within the longest common prefix is one, since only the field A occurs at a higher level. Therefore the repetition level of the second entry for column A.B.D is 1. A similar analysis would be applied to the third entry to also get a repetition level of one.

In another example, if a record contained the following entries:
Entry 1: A.B.C
Entry 2: .C
Entry 3: .C The repetition level of the first entry for a column A.B.D would be zero since it is the first entry. To determine the repetition level of the second entry, the longest common prefix between the leaf name (which is the path A.B.C) and the column name (A.B.D) is identified. This longest common prefix is A.B. The repetition level of the second entry is then given by the level of nesting of the first field common to both the second entry (.C) and the longest common prefix (A.B) within the longest common prefix (A.B). In this case, there are no fields common to the second entry and the longest common prefix so the repetition levels and the definition levels for the second entry will be empty.

In a third example, if a record contained the following entries:
Entry 1: A.B.G.C
Entry 2: F.G.C The repetition level of the first entry (C) for a column A.B.G.Q would be zero since it is the first entry. To determine the repetition level of the second entry, the longest common prefix between the leaf name (which is the path A.F.G.C) and the column name (A.B.G.Q) is identified. This longest common prefix is simply A. The repetition level of the entry is then given by the level of nesting of the first field common to both the entry (F.G.C) and the longest common prefix (A) within the longest common prefix (A). In this case, there are no fields common to the entry and the longest common prefix so the repetition levels and the definition levels for this entry will be empty.

Once the repetition levels and definition levels of the entry for other columns have been stored, or if there no other columns in the row group, at step 413 it is determined whether there are additional entries in the record. If so, the next entry is read at step 402 and the process repeats. Otherwise, the next record is read at step 401 and the process repeats.

Figure 5:
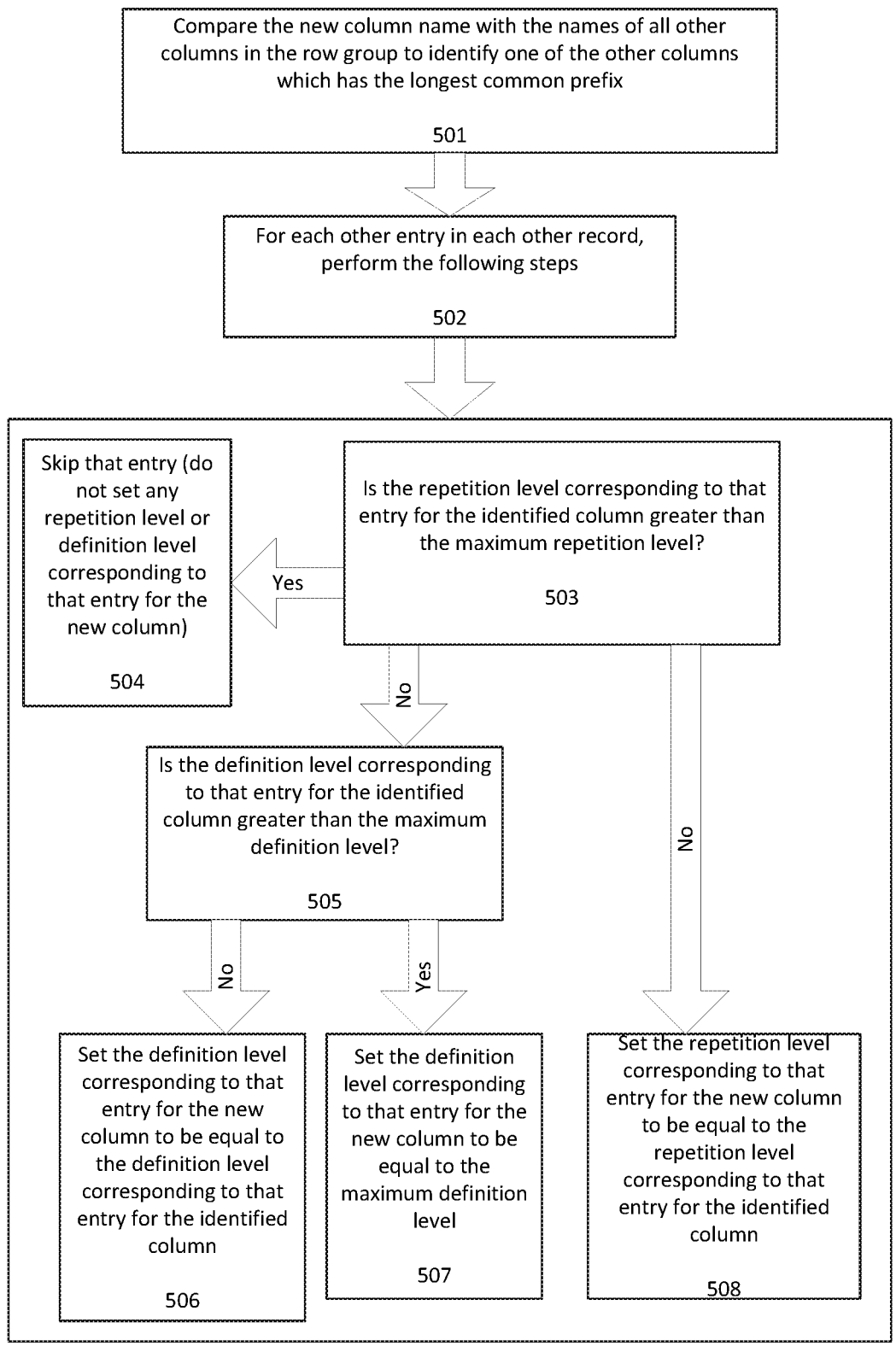
FIG. 5 illustrates a method for updating the definition levels and repetition levels of other entries in the row group when a new column is created according to an exemplary embodiment.

FIG. 5 illustrates a method for updating the definition levels and repetition levels of other entries in the row group when a new column is created. At step 501 the new column name is compared with the names of all other columns in the row group (other than the column corresponding to the leaf name which was created) to identify a column which has the longest common prefix. If there are multiple columns with the longest common prefix, then any one of the multiple columns can be identified in step 501.

Step 502 indicates that the subsequent sequence including one or more of steps 503-508 are performed for every set of definition levels and repetitions levels corresponding to leaves in every other record. During the updating process, it is not necessary to know which entries correspond to which definition levels and repetition levels, as the definition levels and repetition levels can be processed and updated without this knowledge. However, for purposes of clarity, FIG. 5 refers to a repetition level corresponding to an entry and a definition level corresponding to an entry in order to identify the relevant set of repetition and definition levels being processed. In practice, the repetition and definition levels can be processed for each column without knowledge of the corresponding entries.

Steps 503-508 will be described with regard to the processing of a definition level and repetition level corresponding to a single entry in another record.

At step 503 it is determined whether the repetition level corresponding to the entry for the identified column is greater than a maximum repetition level. The maximum repetition level is the highest possible repetition level for the longest shared prefix between the new column and the column identified in step 501. For example, if the longest shared prefix is of length two, then the maximum repetition level is one, since the maximum nesting level of the last data field in the shared prefix is one. If the repetition level corresponding to the entry for the identified column is greater than a maximum repetition level, then at step 504 the repetition level and definition level corresponding to that entry are skipped and no repetition level or definition level is set corresponding to that entry relative to the new column.

Otherwise, at step 505 it is determined whether the definition level corresponding to the entry for the identified column is greater than a maximum definition level. The maximum definition level is the highest possible definition level for the longest shared prefix between the new column and the column identified in step 501. For example, if the longest shared prefix is of length two, then the maximum definition level is one, since the maximum nesting level of the last data field in the shared prefix is one.

If the definition level corresponding to the entry for the identified column is greater than the maximum definition level, then at step 507 the definition level corresponding to the entry for the new column is set to the maximum definition level. Otherwise, at step 506, the definition level corresponding to the entry for the new column is set to the definition level corresponding to the entry for the column identified in step 501. Additionally, at step 508, the repetition level corresponding to the entry for the new column is set to the repetition level corresponding to the entry for the column identified in step 501.

When the input data is semi-structured data and the schema is unknown, all fields are assumed to be optional, and therefore the maximum repetition level will be equal to the maximum definition level. The process is repeated for all leaves of all other records. The repetition and definition levels for the new column for the other entries in the current row group are then stored in the table of repetition and definition levels for current row group.

Figure 6A:
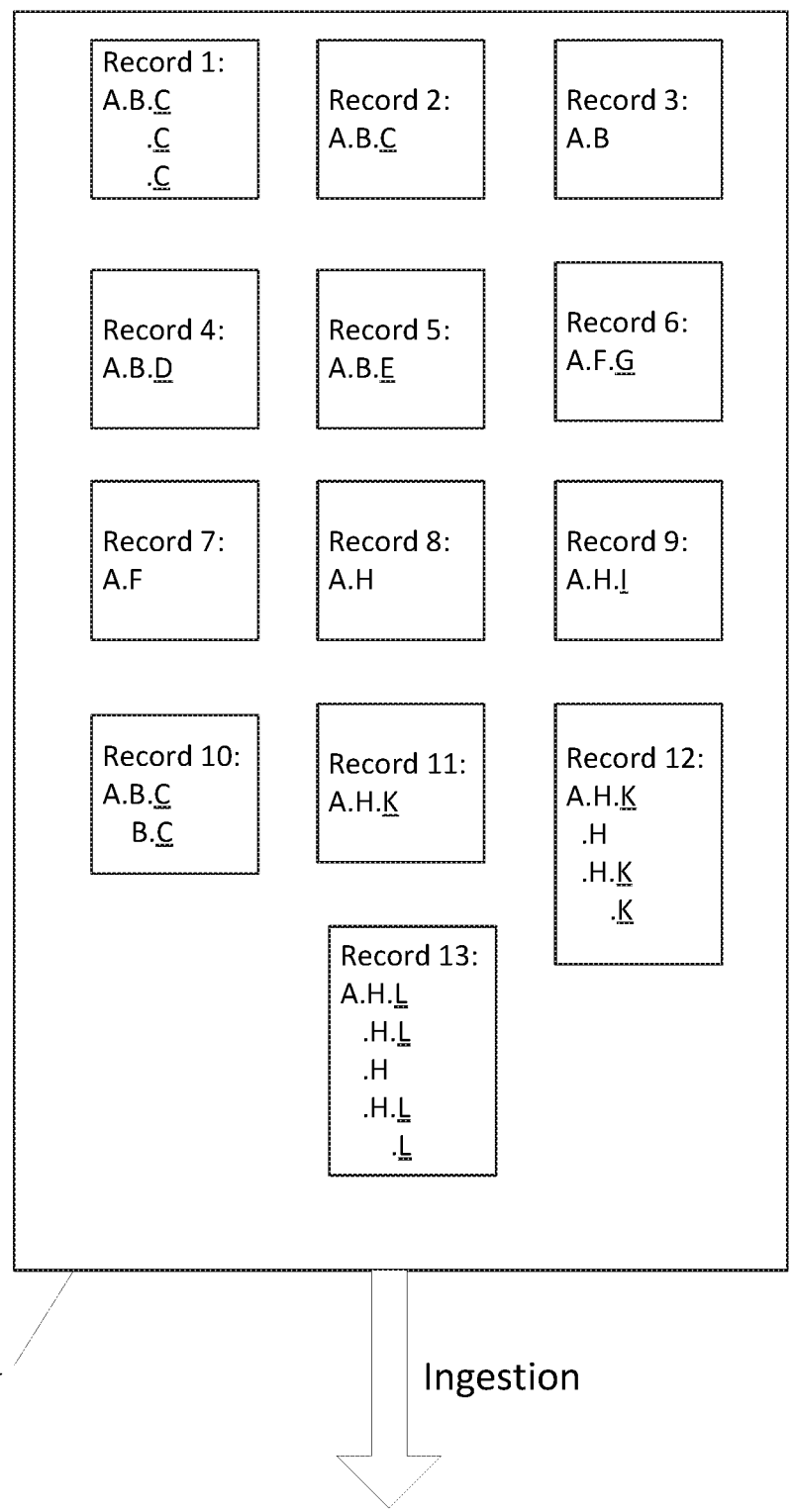
Figure 6B:
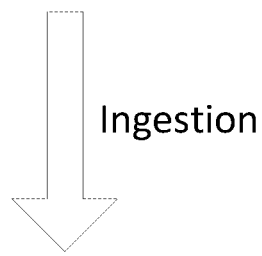

FIG. 6A illustrates an example set 601 of records that are to be ingested in order (i.e., record 1, record 2, record 3 . . . ). FIG. 6B illustrates a repetition and definition level table 602 after record 1 is ingested. As shown in the table 602, a new column has been created for the leaf named A.B.C and the other leaves (which share the same path and thus the same name) have been added to this column and the repetition levels and definition levels of all of the leaves have been stored in the table 602.

Figure 6C:
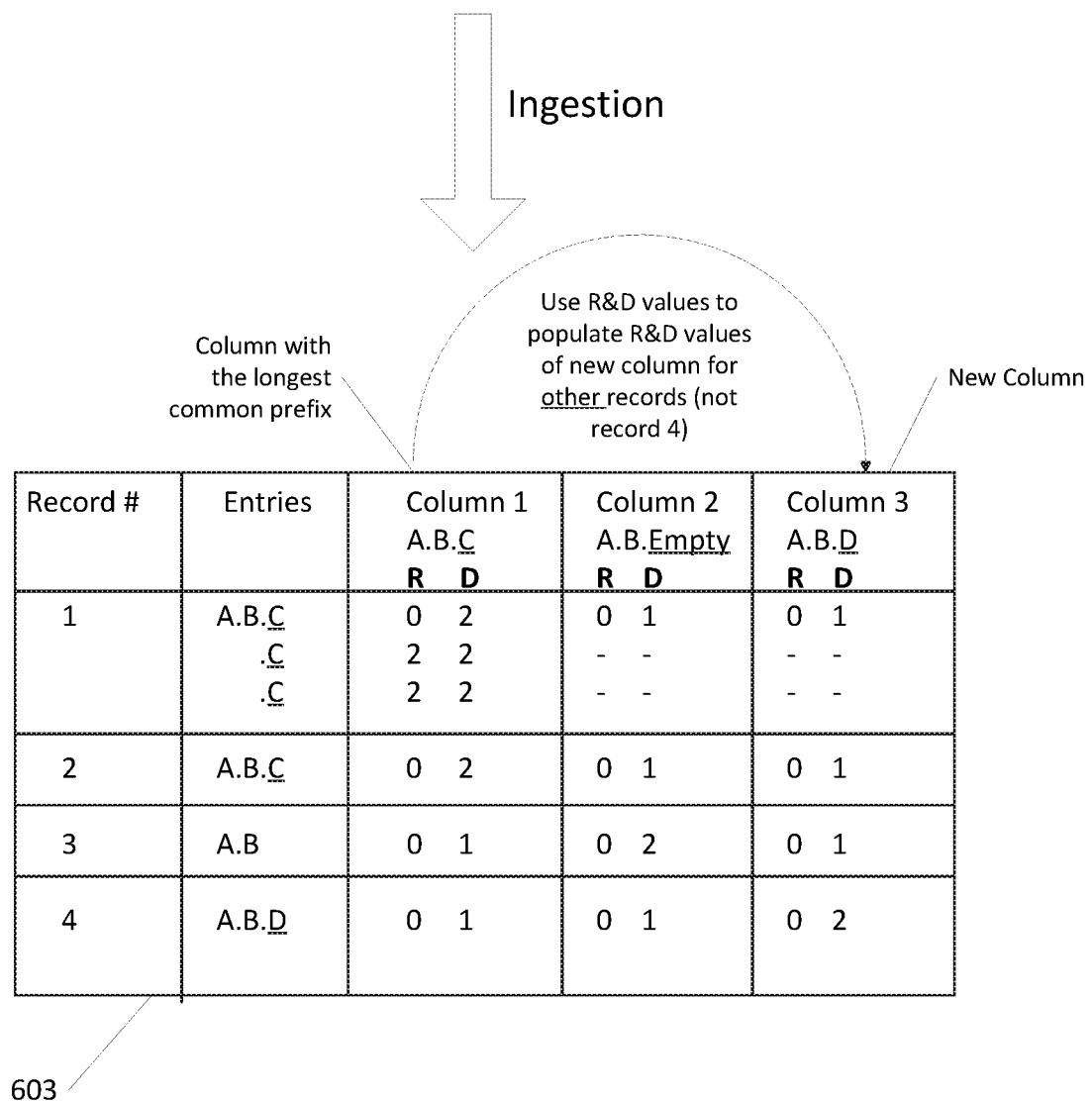

FIG. 6C illustrates a repetition and definition level table 603 after ingestion of records 1-4. As shown in table 603, columns have been created for entries A.B.C, A.B.Empty and A.B.D. Additionally, as shown in table 603, when record 4 is added and new column A.B.D is created corresponding to the leaf named A.B.D, the definition levels and repetition levels of all the entries in records 1-3 for the new column A.B.D are set based upon the repetition and definition levels for the column having the longest common prefix with A.B.D, which is column A.B.C (column A.B.Empty could also have been used). For example, the repetition level of record 2 for column 1 has been copied to column 3. Additionally, as the definition level of record 2 for column 1 is greater (2) than the maximum definition level of the common prefix AB (which is 1), the definition level of record 2 for column 3 is set to the maximum definition level (1).

FIG. 6D illustrates a repetition and definition level table 604 after ingestion of all of the records 1-13. In FIG. 6D, the Boolean empty fields are shown by underlined parenthesis ( ).

Figure 7:
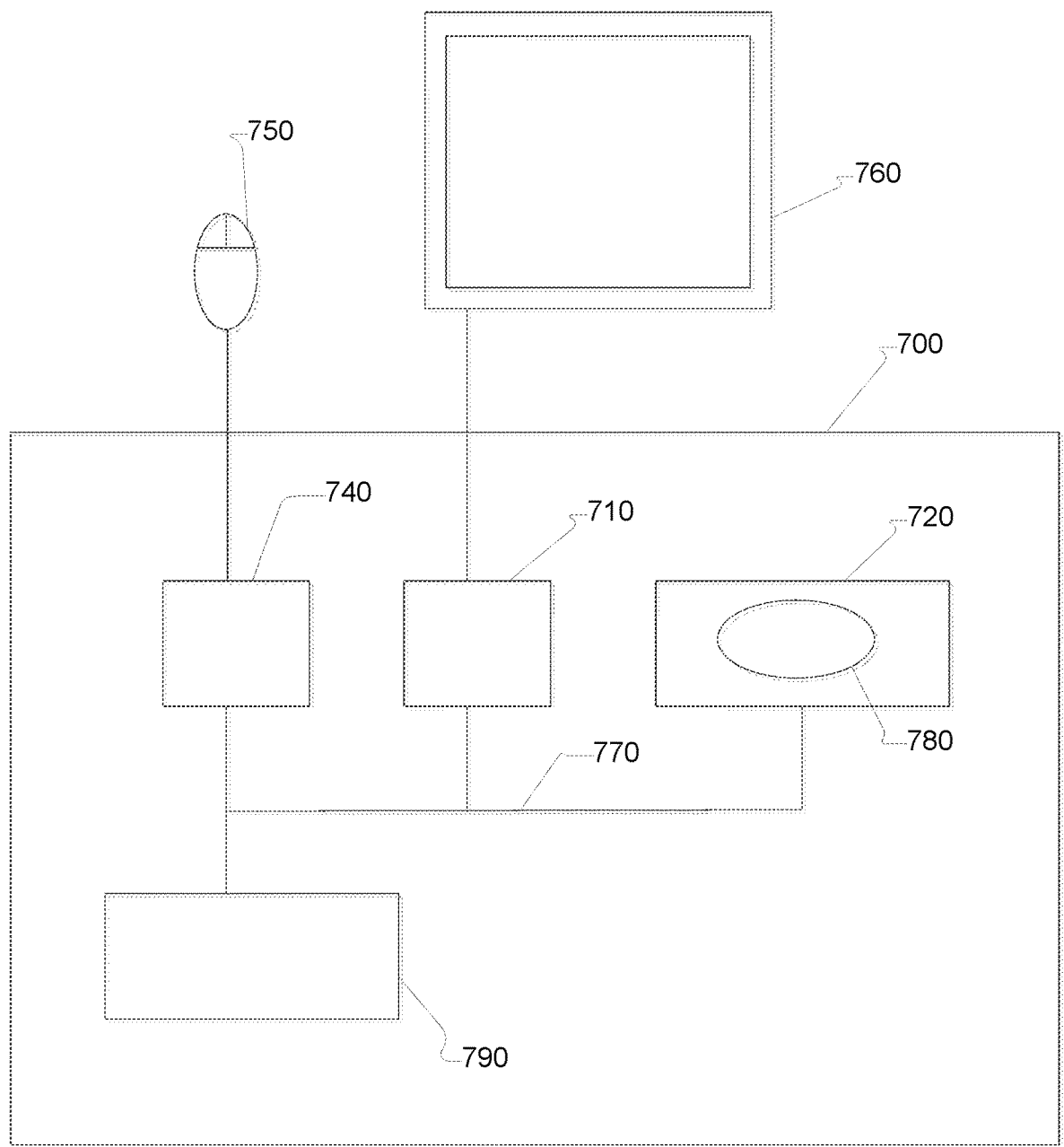
FIG. 7 illustrates an exemplary computing environment that can be used to carry out the methods for ingesting semi-structured data in a columnar format and encoding repetition and definition level values for a semi-structured data record while storing the semi-structured data in columnar format according to an exemplary embodiment.

One or more of the above-described techniques can be implemented in or involve one or more computer systems. FIG. 7 illustrates a generalized example of a computing environment 700. The computing environment 700 is not intended to suggest any limitation as to scope of use or functionality of a described embodiment.

The computing environment 700 includes at least one processing unit 710 and memory 720. The processing unit 710 executes computer-executable instructions and can be a real or a virtual processor. In a multi-processing system, multiple processing units execute computer-executable instructions to increase processing power. The memory 720 can be volatile memory (e.g., registers, cache, RAM), non-volatile memory (e.g., ROM, EEPROM, flash memory, etc.), or some combination of the two. The memory 720 can store software 780 implementing described techniques.

A computing environment can have additional features. For example, the computing environment 700 includes storage 740, one or more input devices 750, one or more output devices 760, and one or more communication connections 790. An interconnection mechanism 770, such as a bus, controller, or network interconnects the components of the computing environment 700. Typically, operating system software or firmware (not shown) provides an operating environment for other software executing in the computing environment 700, and coordinates activities of the components of the computing environment 700.

The storage 740 can be removable or non-removable, and includes magnetic disks, magnetic tapes or cassettes, CD-ROMs, CD-RWs, DVDs, or any other medium which can be used to store information and which can be accessed within the computing environment 700. The storage 740 can store instructions for the software 780.

The input device(s) 750 can be a touch input device such as a keyboard, mouse, pen, trackball, touch screen, or game controller, a voice input device, a scanning device, a digital camera, remote control, or another device that provides input to the computing environment 700. The output device(s) 760 can be a display, television, monitor, printer, speaker, or another device that provides output from the computing environment 700.

The communication connection(s) 790 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 700, computer-readable media include memory 720, storage 740, communication media, and combinations of any of the above.

Of course, FIG. 7 illustrates computing environment 700, display device 760, and input device 750 as separate devices for ease of identification only. Computing environment 700, display device 760, and input device 750 can be separate devices (e.g., a personal computer connected by wires to a monitor and mouse), can be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 700 can be a set-top box, personal computer, or one or more servers, for example a farm of networked servers, a clustered server environment, or a cloud network of computing devices.

Having described and illustrated the principles of our invention with reference to the described embodiment, it will be recognized that the described embodiment can be modified in arrangement and detail without departing from such principles. It should be understood that the programs, processes, or methods described herein are not related or limited to any particular type of computing environment, unless indicated otherwise. Various types of general purpose or specialized computing environments can be used with or perform operations in accordance with the teachings described herein. Elements of the described embodiment shown in software can be implemented in hardware and vice versa.

In view of the many possible embodiments to which the principles of our invention can be applied, we claim as our invention all such embodiments as can come within the scope and spirit of the following claims and equivalents thereto

What is claimed is:

1. A method executed by one or more computing devices for efficiently transforming, without prior knowledge of a schema, non-columnar semi-structured data into a columnar format that is able to be queried, the method comprising:

storing, by at least one of the one or more computing devices, a current schema corresponding to any previously parsed data records in a current row group, wherein the current schema comprises one or more current fields having one or more corresponding current data types and wherein the one or more current fields and the one or more corresponding current data types are based on any previously parsed data records in the current row group;

parsing, by at least one of the one or more computing devices, a new data record, wherein the new data record comprises semi-structured data including one or more data fields and one or more data values corresponding to the one or more data fields;

generating, by at least one of the one or more computing devices, a new schema corresponding to the new data record based on the parsed new data record, wherein the new schema comprises the one or more data fields and one or more data types corresponding to the one or more data fields;

determining, by at least one of the one or more computing devices, whether the new schema corresponding to the new data record is homogenous with the current schema corresponding to any previously parsed data records in the current row group by comparing the one or more data fields and the one or more data types to the one or more current fields and the one or more current data types, wherein the new schema is homogenous with the current schema when there is no data field that matches a current data field while having a corresponding data type that is different than a corresponding current data type; and storing, by at least one of the one or more computing devices, the data record as a new record in the current row group based at least in part on a determination that the schema corresponding to the data record is homogenous with the schema corresponding to a current row group, wherein the current row group comprises a set of rows stored in a columnar format that is able to be queried, the set of rows being organized in one or more columns corresponding to the one or more data fields and having one or more column types corresponding to the one or more data types.

2. The method of claim 1, wherein the current row group has a maximum size and wherein storing the data record as a new record in the current row group comprises:

storing the data record in the current row group based at least in part on a determination that the schema corresponding to the data record is homogenous with the current schema and a determination that a combined size of the current row group and the data record does not exceed a maximum size.

3. The method of claim 1, further comprising:

generating, by at least one of the one or more computing devices, a new row group based at least in part on a determination that the schema corresponding to the data record is not homogenous with the current schema, wherein the new row group comprises a second set of rows stored in a columnar format that is able to be queried, the second set of rows being organized in one or more new columns corresponding to the one or more fields and one or more new column types corresponding to the one or more data types;
updating by at least one of the one or more computing devices, the current schema to correspond to the new schema corresponding to the data record; and
storing, by at least one of the one or more computing devices, the data record as a new record in the new row group.

4. The method of claim 1, further comprising:
identifying, by at least one of the one or more computing devices, at least one new field in the one or more data fields which does not appear in the one or more current fields; and
updating, by at least one of the one or more computing devices, the current schema to include the at least one new field and at least one new field type corresponding to the at least one new field.

5. The method of claim 4, wherein the current row group comprises one or more column chunks corresponding to the one or more columns and wherein storing the data record as a new record in the current row group comprises:
adding, by at least one of the one or more computing devices, at least one column chunk corresponding to the at least one new field to the one or more column chunks in the current row group;
storing, by at least one of the one or more computing devices, the one or more data values in corresponding column chunks in the one or more column chunks; and
storing, by at least one of the one or more computing devices, a NULL value in the at least one new column chunk for any existing records in the current row group.

6. The method of claim 5, wherein storing the data record as a new record in the current row group further comprises:
identifying, by at least one of the one or more computing devices, at least one missing field corresponding to at least one current field in the one or more current fields which does not appear in the one or more data fields; and
storing, by at least one of the one or more computing devices, a NULL value in at least one column chunk corresponding to the at least one missing field for the new record.

7. The method of claim 1, wherein the current row group comprises one or more column chunks, wherein the data record comprises one or more entries, and further comprising:
encoding, by at least one of the one or more computing devices, repetition and definition levels of the one or more entries for each column chunk in the one or more column chunks.

8. The method of claim 1, further comprising:
determining, by at least one of the one or more computing devices, whether the new schema corresponding to the data record is homogenous with a previous schema corresponding to a previous row group stored in a buffer, wherein the buffer stores one or more previous row groups which have not reached a predetermined size threshold; and
storing, by at least one of the one or more computing devices, the data record as a new record in the previous row group based at least in part on a determination that the new schema corresponding to the data record is homogenous with the schema corresponding to the previous row group.

9. The method of claim 1, further comprising:
receiving, by at least one of the one or more computing devices, a query identifying one or more query data fields and one or more corresponding query data types;
identifying, by at least one of the one or more computing devices, a schema in one or more schemas which is homogenous with the one or more query data fields and the one or more corresponding query data types, wherein the identified schema has a corresponding row group; and
executing, by at least one of the one or more computing devices, the query on the corresponding row group to return data responsive to the query.

10. An apparatus for efficiently transforming, without prior knowledge of a schema, non-columnar semi-structured data into a columnar format that is able to be queried, the apparatus comprising:
one or more processors; and
one or more memories operatively coupled to at least one of the one or more processors and having instructions stored thereon that, when executed by at least one of the one or more processors, cause at least one of the one or more processors to:
store a current schema corresponding to any previously parsed data records in a current row group, wherein the current schema comprises one or more current fields having one or more corresponding current data types and wherein the one or more current fields and the one or more corresponding current data types are based on any previously parsed data records in the current row group;
parse a new data record, wherein the new data record comprises semi-structured data including one or more data fields and one or more data values corresponding to the one or more data fields;
generate a new schema corresponding to the new data record based on the parsed new data record, wherein the new schema comprises the one or more data fields and one or more data types corresponding to the one or more data fields;
determine whether the new schema corresponding to the new data record is homogenous with the current schema corresponding to any previously parsed data records in the current row group by comparing the one or more data fields and the one or more data types to the one or more current fields and the one or more current data types, to a current row group, wherein the new schema is homogenous with the current schema when there is no data field that matches a current data field while having a corresponding data type that is different than a corresponding current data type; and
store the data record as a new record in the current row group based at least in part on a determination that the schema corresponding to the data record is homogenous with the schema corresponding to a current row group, wherein the current row group comprises a set of rows stored in a columnar format that is able to be queried, the set of rows being organized in one or more columns corresponding to the one or more data fields and having one or more column types corresponding to the one or more data types.

11. The apparatus of claim 10, wherein the current row group has a maximum size and wherein the instructions that, when executed by at least one of the one or more processors, cause at least one of the one or more processors to store the data record as a new record in the current row group further cause at least one of the one or more processors to:

store the data record in the current row group based at least in part on a determination that the schema corresponding to the data record is homogenous with the current schema and a determination that a combined size of the current row group and the data record does not exceed a maximum size.

12. The apparatus of claim 10, wherein at least one of the one or more memories has further instructions stored thereon that, when executed by at least one of the one or more processors, cause at least one of the one or more processors to:

generate a new row group based at least in part on a determination that the schema corresponding to the data record is not homogenous with the current schema, wherein the new row group comprises a second set of rows stored in a columnar format that is able to be queried, the second set of rows being organized in one or more new columns corresponding to the one or more fields and one or more new column types corresponding to the one or more data types;

update the current schema to correspond to the new schema corresponding to the data record; and store the data record as a new record in the new row group.

13. The apparatus of claim 10, wherein at least one of the one or more memories has further instructions stored thereon that, when executed by at least one of the one or more processors, cause at least one of the one or more processors to:

identify at least one new field in the one or more data fields which does not appear in the one or more current fields; and update the current schema to include the at least one new field and at least one new field type corresponding to the at least one new field.

14. The apparatus of claim 13, wherein the current row group comprises one or more column chunks corresponding to the one or more columns and wherein the instructions that, when executed by at least one of the one or more processors, cause at least one of the one or more processors to store the data record as a new record in the current row group further cause at least one of the one or more processors to:

add at least one column chunk corresponding to the at least one new field to the one or more column chunks in the current row group;

store the one or more data values in corresponding column chunks in the one or more column chunks; and store a NULL value in the at least one new column chunk for any existing records in the current row group.

15. The apparatus of claim 14, wherein the instructions that, when executed by at least one of the one or more processors, cause at least one of the one or more processors to store the data record as a new record in the current row group further cause at least one of the one or more processors to:

identify at least one missing field corresponding to at least one current field in the one or more current fields which does not appear in the one or more data fields; and store a NULL value in at least one column chunk corresponding to the at least one missing field for the new record.

16. The apparatus of claim 10, wherein the current row group comprises one or more column chunks, wherein the data record comprises one or more entries, and wherein at least one of the one or more memories has further instructions stored thereon that, when executed by at least one of the one or more processors, cause at least one of the one or more processors to:

encode repetition and definition levels of the one or more entries for each column chunk in the one or more column chunks.

17. The apparatus of claim 10, wherein at least one of the one or more memories has further instructions stored thereon that, when executed by at least one of the one or more processors, cause at least one of the one or more processors to:

determine whether the new schema corresponding to the data record is homogenous with a previous schema corresponding to a previous row group stored in a buffer, wherein the buffer stores one or more previous row groups which have not reached a predetermined size threshold; and store the data record as a new record in the previous row group based at least in part on a determination that the new schema corresponding to the data record is homogenous with the schema corresponding to the previous row group.

18. The apparatus of claim 10, wherein at least one of the one or more memories has further instructions stored thereon that, when executed by at least one of the one or more processors, cause at least one of the one or more processors to:

receive a query identifying one or more query data fields and one or more corresponding query data types;

identify a schema in one or more schemas which is homogenous with the one or more query data fields and the one or more corresponding query data types, wherein the identified schema has a corresponding row group; and execute the query on the corresponding row group to return data responsive to the query.

19. At least one non-transitory computer-readable medium storing computer-readable instructions that, when executed by one or more computing devices, cause at least one of the one or more computing devices to:

store a current schema corresponding to any previously parsed data records in a current row group, wherein the current schema comprises one or more current fields having one or more corresponding current data types and wherein the one or more current fields and the one or more corresponding current data types are based on any previously parsed data records in the current row group;

parse a new data record, wherein the new data record comprises semi-structured data including one or more data fields and one or more data values corresponding to the one or more data fields;

generate a new schema corresponding to the new data record based on the parsed new data record, wherein the new schema comprises the one or more data fields and one or more data types corresponding to the one or more data fields;

determine whether the new schema corresponding to the new data record is homogenous with the current schema corresponding to any previously parsed data records in the current row group by comparing the one or more data fields and the one or more data types to the one or more current fields and the one or more current data types, wherein the new schema is homogenous with the current schema when there is no data field that matches a current data field while having a corresponding data type that is different than a corresponding current data type; and store the data record as a new record in the current row group based at least in part on a determination that the schema corresponding to the data record is homogenous with the schema corresponding to a current row group, wherein the current row group comprises a set of rows stored in a columnar format that is able to be queried, the set of rows being organized in one or more columns corresponding to the one or more data fields and having one or more column types corresponding to the one or more data types.

20. The at least one non-transitory computer-readable medium of claim 19, wherein the current row group has a maximum size and wherein the instructions that, when executed by at least one of the one or more computing devices, cause at least one of the one or more computing devices to store the data record as a new record in the current row group further cause at least one of the one or more computing devices to:

store the data record in the current row group based at least in part on a determination that the schema corresponding to the data record is homogenous with the current schema and a determination that a combined size of the current row group and the data record does not exceed a maximum size.

21. The at least one non-transitory computer-readable medium of claim 19, further storing computer-readable instructions that, when executed by at least one of the one or more computing devices, cause at least one of the one or more computing devices to:

generate a new row group based at least in part on a determination that the schema corresponding to the data record is not homogenous with the current schema, wherein the new row group comprises a second set of rows stored in a columnar format that is able to be queried, the second set of rows being organized in one or more new columns corresponding to the one or more fields and one or more new column types corresponding to the one or more data types;

update the current schema to correspond to the new schema corresponding to the data record; and store the data record as a new record in the new row group.

22. The at least one non-transitory computer-readable medium of claim 19, further storing computer-readable instructions that, when executed by at least one of the one or more computing devices, cause at least one of the one or more computing devices to:

identify at least one new field in the one or more data fields which does not appear in the one or more current fields; and update the current schema to include the at least one new field and at least one new field type corresponding to the at least one new field.

23. The at least one non-transitory computer-readable medium of claim 22, wherein the current row group comprises one or more column chunks corresponding to the one or more columns and wherein the instructions that, when executed by at least one of the one or more computing devices, cause at least one of the one or more computing devices to store the data record as a new record in the current row group further cause at least one of the one or more computing devices to:

add at least one column chunk corresponding to the at least one new field to the one or more column chunks in the current row group;

store the one or more data values in corresponding column chunks in the one or more column chunks; and store a NULL value in the at least one new column chunk for any existing records in the current row group.

24. The at least one non-transitory computer-readable medium of claim 23, wherein the current row group comprises one or more column chunks, wherein the data record comprises one or more entries, and wherein the instructions that, when executed by at least one of the one or more computing devices, cause at least one of the one or more computing devices to store the data record as a new record in the current row group further cause at least one of the one or more computing devices to:

identify at least one missing field corresponding to at least one current field in the one or more current fields which does not appear in the one or more data fields; and store a NULL value in at least one column chunk corresponding to the at least one missing field for the new record.

25. The at least one non-transitory computer-readable medium of claim 19, further storing computer-readable instructions that, when executed by at least one of the one or more computing devices, cause at least one of the one or more computing devices to:

encode repetition and definition levels of the one or more entries for each column chunk in the one or more column chunks.

26. The at least one non-transitory computer-readable medium of claim 19, further storing computer-readable instructions that, when executed by at least one of the one or more computing devices, cause at least one of the one or more computing devices to:

determine whether the new schema corresponding to the data record is homogenous with a previous schema corresponding to a previous row group stored in a buffer, wherein the buffer stores one or more previous row groups which have not reached a predetermined size threshold; and store the data record as a new record in the previous row group based at least in part on a determination that the new schema corresponding to the data record is homogenous with the schema corresponding to the previous row group.

27. The at least one non-transitory computer-readable medium of claim 19, further storing computer-readable instructions that, when executed by at least one of the one or more computing devices, cause at least one of the one or more computing devices to:

receive a query identifying one or more query data fields and one or more corresponding query data types;

identify a schema in one or more schemas which is homogenous with the one or more query data fields and the one or more corresponding query data types, wherein the identified schema has a corresponding row group; and execute the query on the corresponding row group to return data responsive to the query.

* * * * *